June 7, 1927.
J. G. KRENZKE
1,631,537
LUBRICATION SYSTEM FOR TRAIN OF GEARS
Filed April 17, 1922
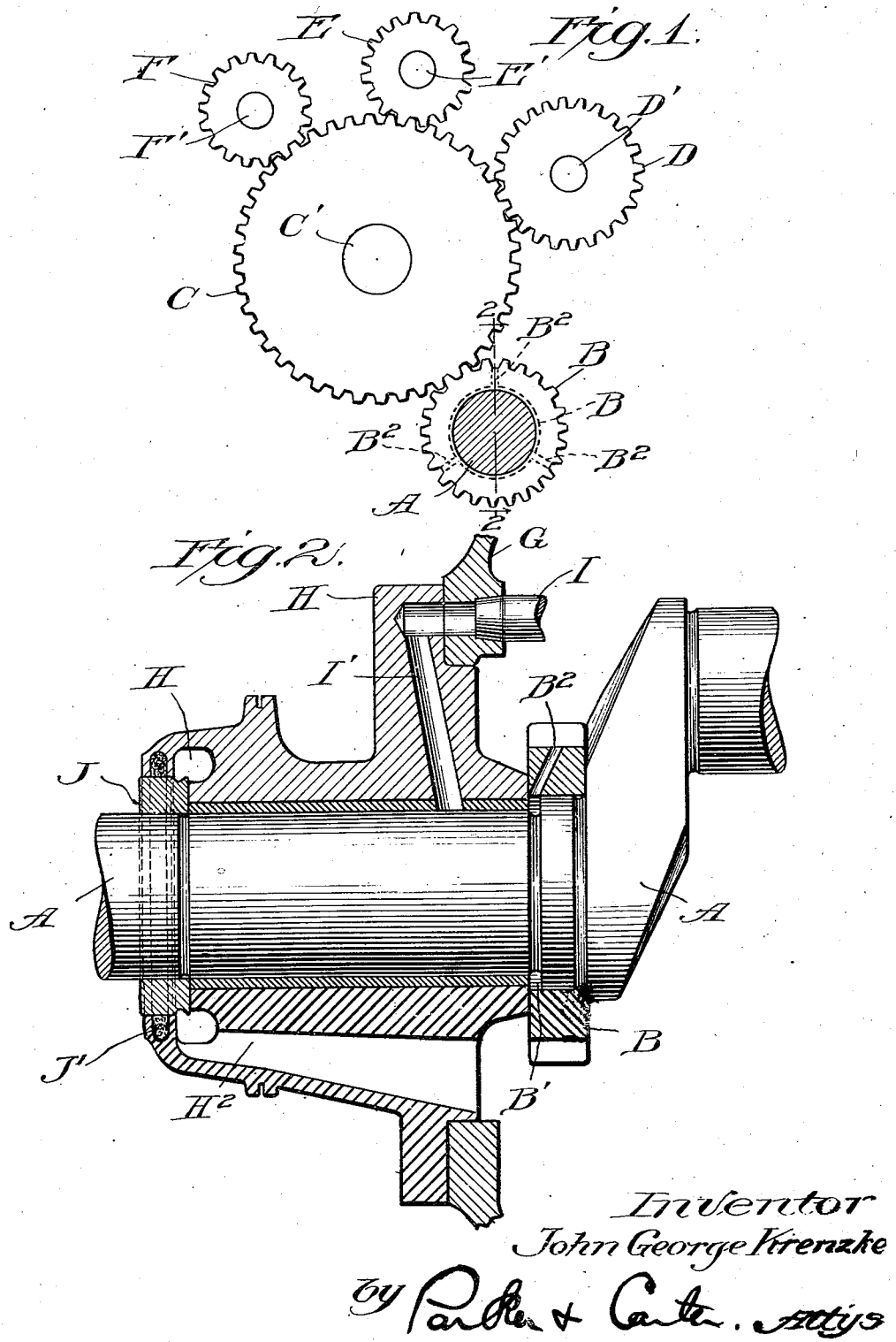
Inventor
John George Krenzke
by Parker & Carter, attys Patented June 7, 1927.

1,631,537

UNITED STATES PATENT OFFICE.

JOHN GEORGE KRENZKE, OF LA PORTE, INDIANA, ASSIGNOR TO ADVANCE-RUMELY COMPANY, OF LA PORTE, INDIANA, A CORPORATION OF INDIANA.

LUBRICATION SYSTEM FOR TRAIN OF GEARS.

Application filed April 17, 1922. Serial No. 553,726.

This invention relates to the arrangement of a train of gears and means for lubricating the same, and particularly to a train of gears intended to be used in an internal combustion engine. It has for one object to provide means whereby the gears in such an engine may be readily and positively driven and timed without the use of any additional means such as idling gears, belts, and the like. It has for another object to provide means whereby said train of gears may be positively lubricated at all times. Other objects will appear from time to time throughout the specification and claims.

My invention is illustrated more or less diagrammatically in the accompanying drawings, wherein:

Figure 1 is an elevation in part diagrammatic and with parts omitted;

Figure 2 is a vertical section on line 2—2 of Figure 1, showing in addition part of the crank case.

Like parts are designated by like characters throughout.

A is the crank shaft of the engine. Upon it is fixed a pinion B and upon the crank shaft adjacent the inside of the pinion B is cut the annular groove B' which serves as an oil duct to introduce oil about the interior of the pinion B. Communicating with this oil duct B' are a plurality of additional oil ducts B² B² which serve to transmit lubricant from the oil duct B' on the interior of the pinion B to the gear teeth on the exterior of the pinion.

The pinion B is in mesh with the cam shaft gear C carried upon a suitable shaft C'. In mesh also with the cam shaft gear C are the following gears, the magneto gear D carried upon a shaft D', a cooling pump gear E carried upon a shaft E', and a governor gear F carried upon a shaft F'.

G is a portion of the crank case, the remainder of which is not shown herewith as it forms no part of the present invention.

Mounted on the crank shaft case is a crank shaft bearing H. The bearing housing is so shaped as to provide at its end an annular duct H' and has within it a lubricant passage H² in communication with the duct H'.

Communicating with the crank shaft bearing is a lubricant feed connection I which communicates with a lubricant duct I' in the bearing housing. At the end of the bearing housing and upon the crank shaft A is a belt pulley spacer J surrounded by a crank shaft oil retainer J' within which is mounted a felt oil retaining ring J².

Although I have shown an operative invention, still it will be obvious that many changes in form, shape, and relation of parts may be made without departing materially from the spirit of my invention, and I wish therefore that my showing be taken as in a sense diagrammatic.

The use and operation of my invention are as follows:

Lubricant is supplied to the crank shaft bearing shown by full force feed. When the lubricant reaches the shaft, some of it works toward the spacer block, lubricating the bearing and finally comes out of the bearing in the annular duct surrounding the spacer block and then falls into the sloping channel H² and so runs back to the well in the bottom of the crank case. At the same time some of the lubricant works in the opposite direction and comes out on the interior of the cam shaft pinion, thence by centrifugal force it is moved through the ducts in the pinion and so comes out on the teeth on the periphery of the pinion. As the crank shaft pinion is thus lubricated it also lubricates the cam shaft gear which comes in contact with it, and the cam shaft gear in turn lubricates the three other gears which mesh with it. Thus a positive and constant supply of lubricant is furnished to all of the parts of the train of gears.

I claim:

1. In combination with a crank shaft of an engine having a bearing, a plurality of gears and means for lubricating said bearing and said gears from said bearing from said shaft, including a pinion fixed adjacent the end of said shaft, said shaft provided about on its exterior under the pinion with a lubricant duct, and ducts for moving lubricant from said duct to the periphery of said pinion, said pinion in mesh with a gear, said gear in mesh with a plurality of other gears, said first mentioned pinion adapted directly to lubricate said gear, and said gear adapted to lubricate from it directly each of said second mentioned gears.

2. In combination with a crank shaft of an engine supported by a bearing means for lubricating said bearing and for lubricating from such bearing other parts, said means including a lubricant retaining groove formed on said shaft, a collar on said shaft adjacent said groove and a pinion fixed on said collar and overlying said groove, ducts through said pinion communicating with the groove whereby lubricant is fed from the groove to the periphery of said pinion after having passed from the bearing to such groove.

3. In combination a gear and a pinion for driving said gear and a plurality of additional pinions in mesh with said gear, means for positively lubricating said bearing and from such bearing said first pinion and from it said additional pinions said means including a shaft, a lubricant retaining groove on said shaft, a collar adjacent said groove on said shaft, said first mentioned pinion being fixed on said collar and ducts through said pinion whereby lubricant is carried by centrifugal force from said groove to the periphery of said pinion to supply lubricant to said gear.

Signed at La Porte, county of La Porte and State of Indiana, this 11th day of April, 1922.

JOHN GEORGE KRENZKE.